W. DICK.
GLASS WASHING APPARATUS.
APPLICATION FILED APR. 30, 1918.

1,317,558.

Patented Sept. 30, 1919.
3 SHEETS—SHEET 1.

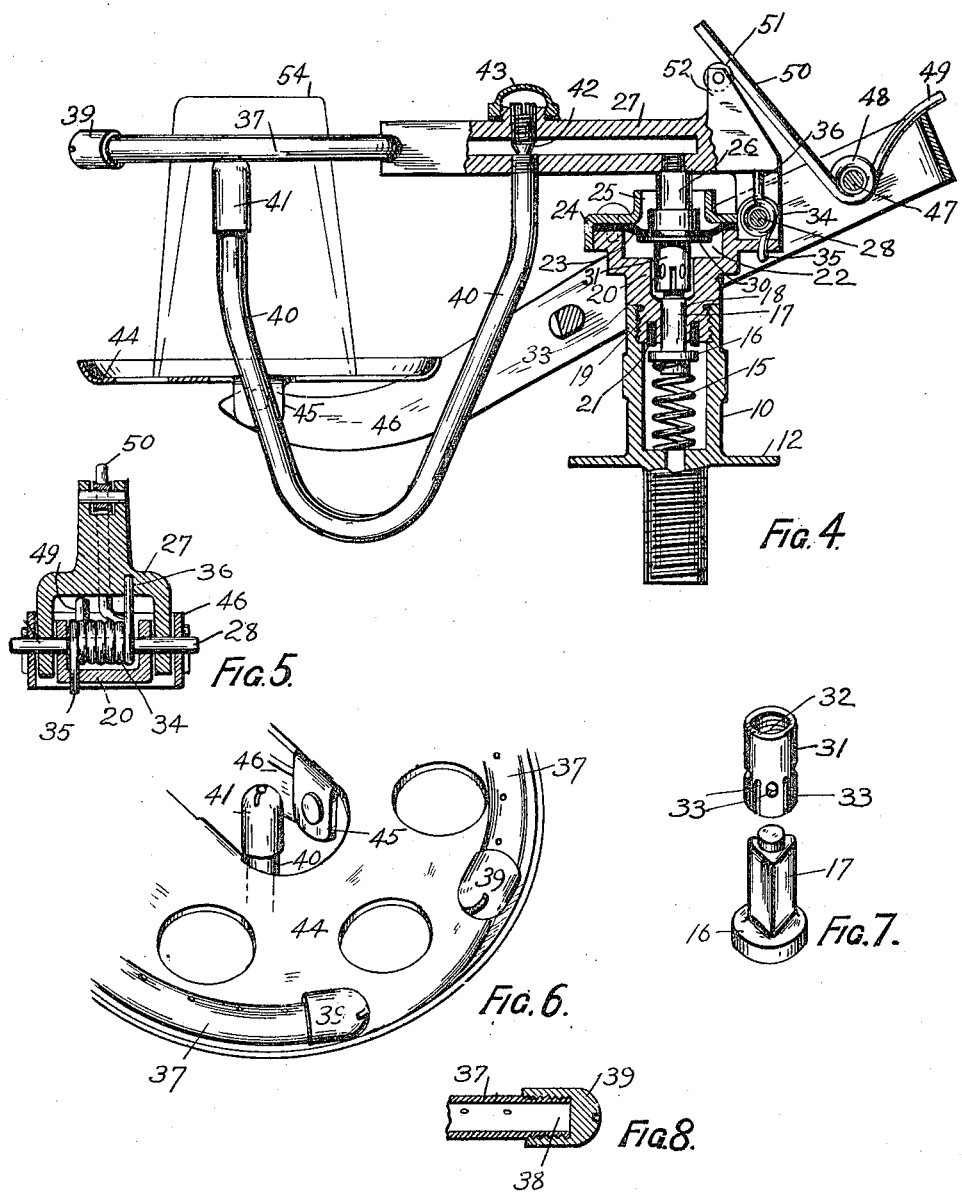

UNITED STATES PATENT OFFICE.

WILLIAM DICK, OF HAMILTON, NEWCASTLE, NEW SOUTH WALES, AUSTRALIA.

GLASS-WASHING APPARATUS.

1,317,558.     Specification of Letters Patent.    Patented Sept. 30, 1919.

Application filed April 30, 1918. Serial No. 231,719.

*To all whom it may concern:*

Be it known that I, WILLIAM DICK, a subject of the King of Great Britain and Ireland, residing at Hamilton, Newcastle, in the State of New South Wales, Commonwealth of Australia, have invented certain new and useful Improvements in Glass-Washing Apparatus, of which the following is a specification.

This invention relates to apparatus for cleansing drinking vessels such as glasses or tumblers, which are placed in an inverted position upon a perforated tray, surrounded by a spray ring and a centrally placed nozzle, preferably in the same plane.

In order that my invention may be more clearly understood I shall now refer to the accompanying drawings in which:—

Figs. 3 and 4 are central longitudinal sectional elevations the latter being in the operative position.

Fig. 5 is vertical section on line 5 5, Fig. 3.

Fig. 6 is enlarged perspective view of the front portion of the apparatus, detailing the closure caps on the spray-ring.

Fig. 7 is detailed perspective view of the spring controlled valve.

Fig. 8 is sectional view of one of the closure caps of the spray-ring.

Figure 1:
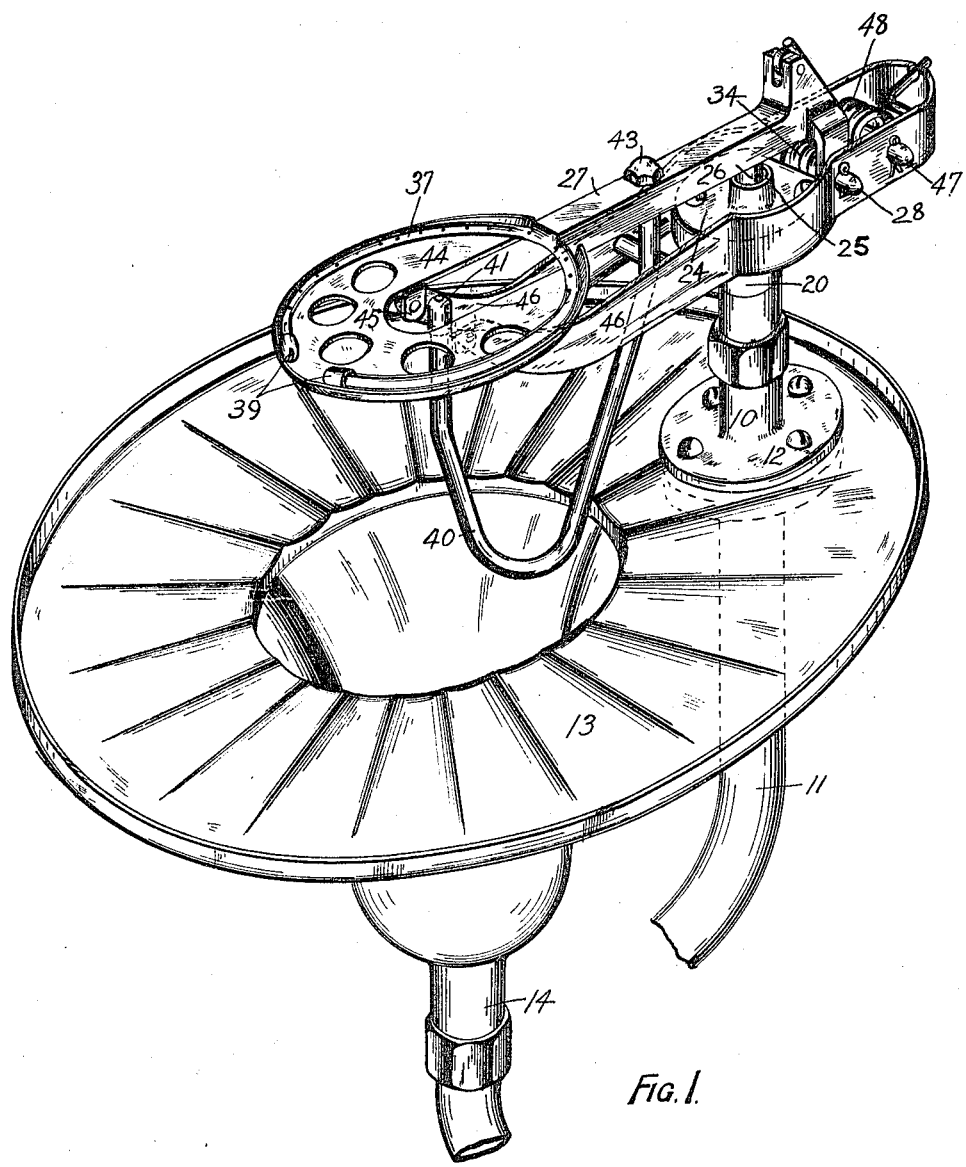
Figure 1 is a perspective view of my apparatus positioned above a draining tray.
Figure 2:
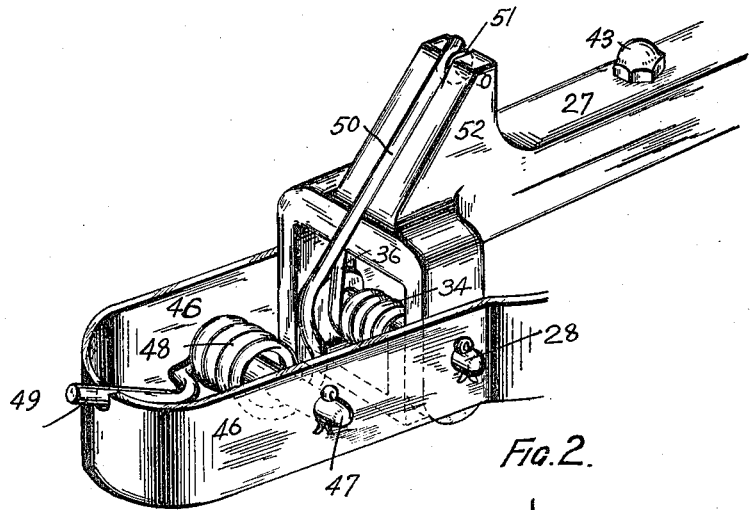
Fig. 2 is enlarged perspective view of the rear portion of the apparatus detailing the coil springs.
Figure 3:
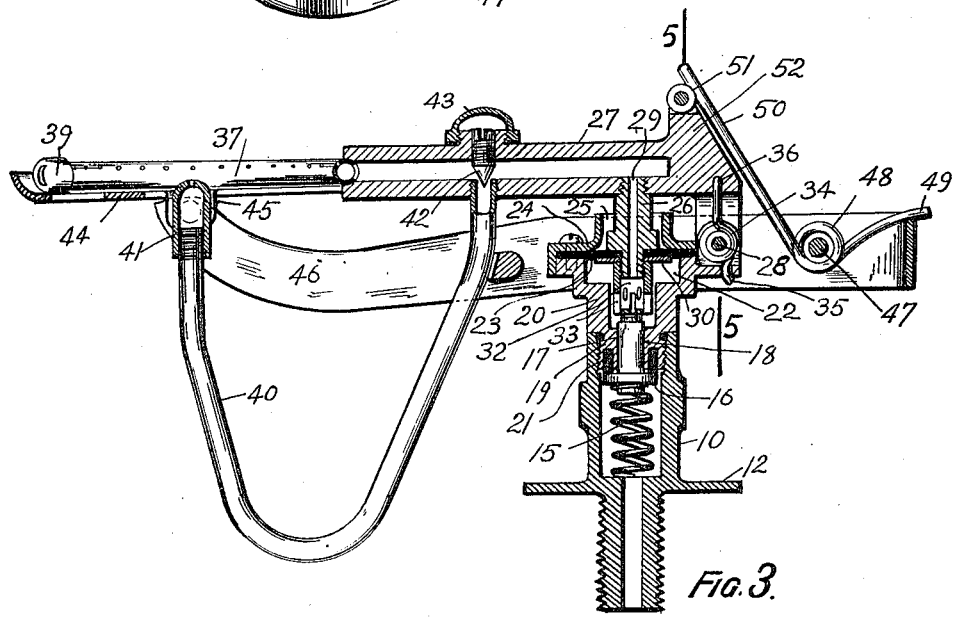

The hollow tail piece 10 is secured to the supply pipe 11 and has a flange 12 to which is secured the draining tray 13 provided with a waste pipe 14. Within this hollow tail piece 10 is contained a coil spring 15 bearing against a disk-valve 16 having a prismatic stem 17. This stem has bearing in the hollow passage 18 of the socket end 19 of the valve-casing 20 secured to the tail piece and the disk-valve bears against the rubber seating 21 contained in the socket end. The valve casing has a chamber 22 for the flexible diaphragm 23 clamped thereto by the cover 24 provided with a flaring mouth 25, through which passes the hollow extension member 26 attached to the hollow arm 27 pivoted at 28 to the valve chamber 20.

The extension member 26 has a through passage 29 and is secured to the diaphragm by the washer 30 and adjusting sleeve 31 within which is the chamber 32 into which leads the passage 29 of the extension member and the chamber 32 is again connected to the valve passage 18 by port passages 33.

The adjusting sleeve is held clear of the valve stem by the coil spring 34 surrounding the pivot-pin 28 and which has one end 35 attached to the valve-casing and the other end 36 to the hollow arm, thus allowing the spring 15 to hold the disk valve 16 against its rubber seating 21, when the apparatus is out of action.

The hollow arm carries on its forward end an open spray-ring having a pair of closure caps 39 at its ends and which may be removed to permit of the ring being cleansed internally when required.

Depending from the hollow arm is the U pipe 40 carrying the central nozzle 41 (preferably in the same plane as the spray-ring).

At the junction of this U pipe 40 and hollow arm 27 is the adjustable reducing valve 42 having a screw cover 43 for the purpose of regulating the quantity and pressure of the water passing into the U pipe.

Underlying the spray-ring is a perforated tray 44 pivotally connected by the lugs 45 to the U shaped lever 46, said lever being pivoted at 28 to the valve casing; and having at its rear end a transverse pin 47 surrounded by the coil spring 48, one tangential end 49 resting upon the bend of the lever 46, and the other 50 bearing against the friction roller 51 held in the jaws 52 integral with the hollow arm, thus insuring easy working of the parts. When the lever 46 is depressed the disk valve 16 will be removed from its seating 21 through the interaction of the coil spring 48 operating the hollow arm and its extension.

In operation, a drinking vessel, glass or tumbler 54 being placed upon the perforated tray 44 the whole is depressed (see Fig. 4) causing the lever 46 to increase the tension of the coil spring 48 which overcoming the tension of the coil spring 34 operates the hollow arm together with its extension. This latter taking against the valve stem 17 removes the valve from its seating and allows the cleansing fluid from the supply pipe to pass into the chamber 32 of the push nut and by passage 29 to the hollow arm 27 thence to the spray-ring and simultaneously through the U pipe to the nozzle.

The fluid from the spray-ring and nozzle will impinge simultaneously against the external and internal surfaces of the drinking vessel and the waste fluid falling upon the draining tray passes into the escape pipe.

When the pressure on the tumbler is released the lever 46 will return to the normal position through the tension of the spring 34 overcoming the spring 48 and the push nut allowing the valve 16 to return to its seating thereby cutting off the flow from supply pipe.

What I claim and desire to secure by Letters Patent is:—

1. A glass washing apparatus comprising a valve casing having means at the lower end for the attachment of a supply pipe thereto, a flexible diaphragm extending across the valve casing, a valve to control the passage of water through the casing and connected to and movable with the diaphragm, a spring to normally hold the valve in closed position, a duct pivotally mounted on the casing and having a downwardly directed tubular arm extending through and connected to the diaphragm, said duct also having a spray ring and a nozzle arranged centrally of the spray ring at its free end, a lever pivotally mounted on the valve casing and having a tray at its free end, and a spring to normally raise the free end of the said lever.

2. A glass washing apparatus comprising a valve casing having means at the lower end for the attachment of a supply pipe thereto, a drainage tray secured to the valve casing and having a drainage outlet, a flexible diaphragm extending across the valve casing, a valve to control the passage of water through the casing and connected to and movable with the diaphragm, a spring to normally hold the valve in closed position, a duct pivotally mounted on the casing and having a downwardly directed tubular arm extending through and connected to the diaphragm, said duct also having at its free end a spray ring and a nozzle arranged centrally with reference to the spray ring, a lever pivotally mounted on the valve casing and having a glass holding tray at its free end, said tray having an opening through which the nozzle extends, and a spring to normally raise the free end of the said lever and said glass holding tray.

Signed at Newcastle this twenty-sixth day of February, 1918.

WILLIAM DICK.